United States Patent [19]

Oettl

[11] Patent Number: 4,609,316

[45] Date of Patent: Sep. 2, 1986

[54] DEVICE FOR FASTENING AN OBJECT AGAINST A WALL OR THE LIKE

[75] Inventor: Reinhold Oettl, Nufringen, Fed. Rep. of Germany

[73] Assignee: Stumpp & Kurz GmbH & Co., Fed. Rep. of Germany

[21] Appl. No.: 615,487

[22] Filed: May 30, 1984

[30] Foreign Application Priority Data

Jun. 1, 1983 [DE] Fed. Rep. of Germany ....... 3319902

[51] Int. Cl.[4] ............................................. F16B 13/04
[52] U.S. Cl. ....................................... 411/45; 411/55; 411/61; 411/75
[58] Field of Search ...................... 411/32, 33, 44, 45, 411/55, 60, 61, 63, 64, 65, 66, 75

[56] References Cited

U.S. PATENT DOCUMENTS

| 699,245 | 5/1902 | Russell | 411/61 |
|---|---|---|---|
| 1,153,335 | 9/1915 | Pleister | 411/63 |
| 3,766,819 | 10/1973 | Giannuzzi | 411/60 |
| 3,922,947 | 12/1975 | Leonardo | 411/60 |
| 4,284,379 | 8/1981 | Chaiko | 411/61 |
| 4,474,516 | 10/1984 | Schiefer | 411/55 X |
| 4,482,277 | 11/1984 | Schiefer | 411/63 X |

FOREIGN PATENT DOCUMENTS

| 2554851 | 6/1976 | Fed. Rep. of Germany | 411/61 |
|---|---|---|---|
| 2927373 | 1/1981 | Fed. Rep. of Germany | 411/55 |
| 1327260 | 4/1963 | France | 411/65 |

Primary Examiner—Thomas J. Holko
Attorney, Agent, or Firm—Jones, Tulalr & Cooper

[57] ABSTRACT

A device for fastening an object against a wall as a plug-in mounting is described, which is provided with an externally threaded bolt, onto one end of which a nut can be threaded and on the other end of which, which is at least partially conical and the maximum diameter of which is equal at most to the diameter of the bolt, an expander element composed of two half-shell-like parts is displaceably held. The two half-shell-like expander parts are provided, on their two longitudianl edges which in the mounted state are located opposite one another, with at least two lobes each, which for mutually securing one another axially engage one another adjacently and are held on the conical end by positive adjacent engagement in the radial direction and are disposed on the expander element in such a manner that the expander element parts are transversely symmetrical or in the developed state are point-symmetrical.

The half-shell-like expander element parts have at least one stamped-out notch in their back remote from the lobes and beginning at at least one of their transverse edges. Furthermore, the inner lobes of the expander element parts, which protrude outward at a tangent, are provided with a bevelled area at the inner face. A weakening groove is provided in the back or in the vicinity of the outer lobes.

34 Claims, 10 Drawing Figures

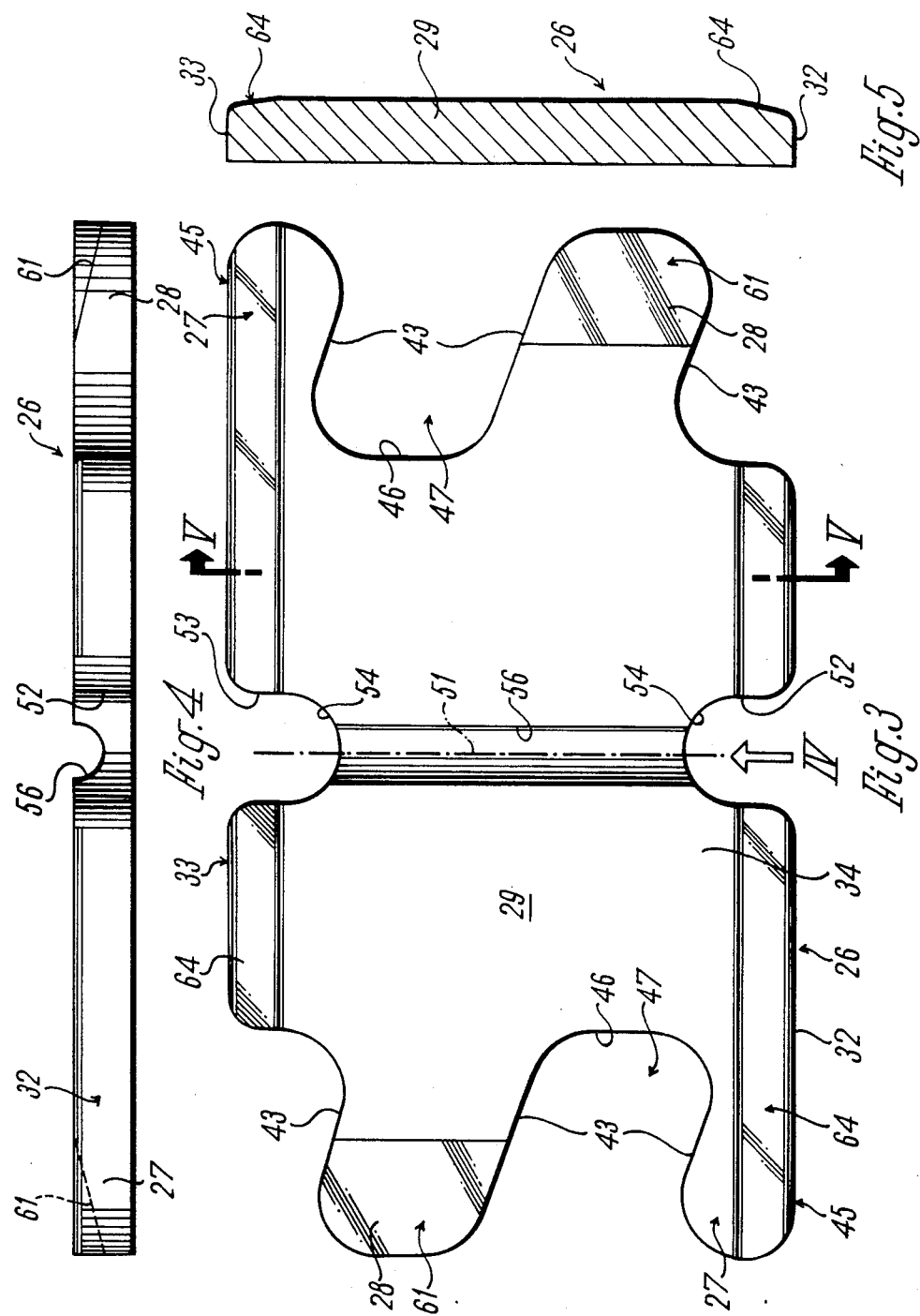

DEVICE FOR FASTENING AN OBJECT AGAINST A WALL OR THE LIKE

BACKGROUND OF THE INVENTION

The present invention relates to a device for fastening an object against a wall or the like, as a plug-in mounting.

Such devices generally have an externally threaded bolt onto one end of which a nut is threaded and onto the other end of which an expander element is mounted. The end on which the expander element is mounted is at least partially conical, the maximum diameter of which is at most equal to the diameter of the bolt. The expander element comprises two half-shell-like parts held in a displaceable manner. The two half-shell-like expander element parts are provided on their two long edges, which in the assembled state are located opposite one another, with at least two lobes each formed thereon, which for the sake of mutually securing one another axially are engaged adjacent one another and are held in the radial direction on the conical end by positive adjacent engagement. The lobes are disposed on the expander element in such a manner that the expander element parts are transversely symmetrical, or when viewed in development are point-symmetrical.

In such devices, which are known from U.S. Pat. No. 4,334,813 and German laid-open application DE-OS No. 29 27 373, it has been found that where cracks or fissures have later formed in the concrete, particularly cracks or fissures 1 mm or 1.5 mm in width, these devices—that is, the outer threaded both including the half-shell-like expander element parts—either have not held or have fallen out later. Since when the outer threaded bolt slips out, the expander element parts are no longer spread apart or have slipped over the cone of the bolt, the entire device has been pulled out of the object it was being used to secure in such cases.

OBJECT AND SUMMARY OF THE INVENTION

It is accordingly a principal object of the present invention to provide a device for fastening an object against a wall or the like, as a plug-in mounting, of the above-described general type in such a way that even if a fissure or crack forms in the concrete at the location where the fastening device or devices are disposed, it will still hold at least well enough that the secured object will not fall from the wall or ceiling where it is mounted.

In a device for fastening an object against a wall or the like, as a plug-in mounting, as generally described above, this object is attained in that the half-shell-like expander element parts each have, remote from the lobes, at least one stamped-out notch extending in from an end face and a longitudinal groove. Both the notch and groove are formed in a flattened area on one side of the expander element which also includes an inner crimp and an outer bulge.

By the provisions according to the present invention each of the half-shell expander element parts can be spread apart more easily. That is, the expander element parts slide in the axial direction along the cone that spreads them apart even if, as happens when a crack appears in the concrete at the fastening point, the relative friction between the outside of the expander element parts and the inner wall of the hole in the concrete is relatively slight. Because of the recesses and the longitudinal groove, including the crimp on the inside and the bulge on the outside, the expander element part is capable of spreading apart relatively easily at the back, that is, with the "seam" acting as a hinge, in the area of the inner and outer lobes, without forgoing the existing advantages associated with the fact that the expander element parts remain together on the bolt cone. The outer bulge has the further advantage that an additional zone is provided which effects a certain amount of friction between the outside of the expander element parts and the inner wall of the fastening bore in the concrete. In tests with a 1 mm and 1.5 mm fissure, it has been demonstrated that even in the latter case of the relatively wide fissure, the expander element parts do not fall out if the device yields inside the bore or the threaded bolt is pulled out by the weight of the secured object but instead move along the bolt cone and accordingly spread apart, so that they can once again lodge firmly, in a barbed or spiked manner, in the bore that has been enlarged as a result of the fissure. The secured object is thus prevented from falling from the wall or ceiling.

In a variant of this preferred exemplary embodiment of the present invention, in addition to the above-mentioned provisions, the lobes, preferably in the inner ones, that protrude outward at a tangent on the expander element parts are provided with a bevelled zone on the inside and/or outside. As a result, if a fissue appears and the externally threaded bolt then yields, the expander element parts slide more easily along the cone because in the case of mounting in a normal hole (one without a fissure), a wedge-shaped zone remains free between the surface of the bolt cone and the opposing inner faces of the inner lobes, and this zone is initially available to be filled during further spreading of the expander element parts. It does not matter whether the bevelling is provided on the inside and/or on the outside, because in either case the inside distance between the outer edges of the free ends of the inner lobes must have a specific, predetermined value.

According to a variant of the present invention, preferably the outer lobes are provided with a weakening groove extending substantially over their width, while the inner lobes are provided with a bevelled or flattened area on their inner and/or outer surface. With this variant it is easier for the half-shell expander element parts to spread apart. That is, the expander element parts slide in the axial direction along the cone that spreads them apart even if, as is the case when a crack appears in the concrete at the fastening point, the relative friction between the outside of the expander element parts and the inner wall of the bore in the concrete is relatively slight. Aside from the recesses at the back of the expander element parts which are provided here as well, in this version the desired hinge-like and therefore ready spreading apart of the expander element parts is shifted away from the area of the back to the area of the lobes, preferably the outer lobes, which are provided with a weakening groove extending substantially over their width. In other words this produces substantially the same effect, that a desired deformation location provides, as a result of which the expander element parts can easily slide along the bolt cone and spread apart if a crack appears in the mounting hole. In this version as well, the lobes, preferably the inner ones, that protrude outward at a tangent on the expander element parts are provided with a bevelled zone on the inside and/or the outside. The result, as already mentioned, is that if a fissure appears and the outer threaded bolt yields, the sliding of the expander element parts on the cone is facilitated, because with mounting in a normal hole (without any fissure) a wedge-shaped zone remains free between the surface of the bolt cone and the opposing inner faces of the inner lobes, which can be filled up first upon a further spreading apart. Here again, it is immaterial whether the bevelling is provided on the inside and/or the outside, because in any case the inside distance between the outer edges of the free ends of the inner lobes must have a specific, predetermined value.

Here again, it has been demonstrated in tests with a 1 mm and 1.5 mm fissure that even in the latter case where the fissure is relatively wide, the expander element parts do not fall out if the device yields inside the bore or if the threaded bolt is pulled out by the weight of the secured object but instead move along the bolt cone and accordingly apread apart, so that they can once again lodge firmly, in a barbed or spiked manner, in the bore that has been enlarged as a result of the fissure. The secured object is thus again prevented from falling from the wall or ceiling.

This latter version has the advantage over the first version described above that it can be manufactured at a more favorable cost.

In both versions, it is possible to provide that the end faces, at their edges pointing inward, are provided with a slippage bevel, thereby assuring that the expander element parts, while sliding along the bolt cone, cannot dig into the outer surface of the cone with their end faces or end edges, which could prevent further sliding.

Further details and embodiments of the invention will become apparent from the ensuing description, in which the invention is explained in terms of the exemplary embodiments shown in the drawings.

BRIEF DESCRIPTION OF THE DRAWINGS

FIG. 3 shows a developed view of the expander element part according to FIG. 2;

FIG. 4 is a view taken in the direction of the arrow IV of FIG. 3;

FIG. 5 is a section taken along the line V—V of FIG. 3;

FIG. 10 is illustrates a variant of FIG. 6 with crimped and bulge regions.

DESCRIPTION OF THE PREFERRED EMBODIMENTS

Figure 1:
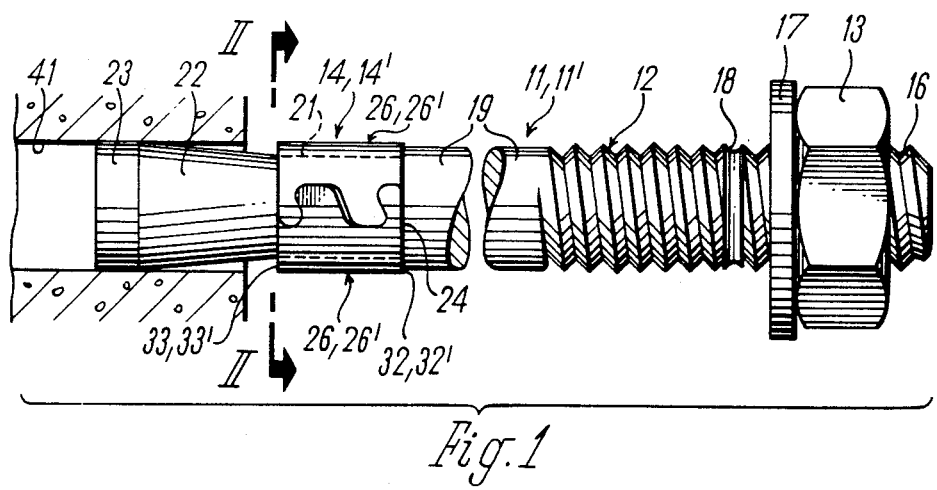
FIG. 1 is a side view of a fastening device in the assembled state, in accordance with the present invention.

The fastening device 11 and 11' according to the invention, which may also be called an externally threaded dowel, peg or tie bolt, serves to fasten objects, as a plug-in mounting, in a mounting bore 41 in a wall, ceiling or the like made of concrete, masonry or the like. The term "plug-in mounting" means that the device 11 or 11' can be inserted while the object is placed against the wall or the like and can then be tightened, because its mounting bore 41 in the wall is approximately equal in diameter to that of the mounting holes in the object to be secured and can thus be used as a template for marking and drilling the mounting bores.

The externally threaded tie bolt or dowel 11 or 11' substantially comprises an externally threaded bolt 12, a nut 13 and an expander element 14 or 14'. The nut 13, which serves to tighten the inserted externally threaded bolt 12, is screwed onto the outer threaded part 16, with an interposed support disc or shim 17, and with the externally threaded bolt 12 in the inserted condition it is generally tightened far enough that a marker ring 18 of the threaded part 16 becomes visible. The shank 19 of the bolt 12 is continuous with the threaded part 16, and at its rear or inner end it merges with a cylindrical zone 21 of smaller diameter, which in the state of rest receives the expander element 14 or 14' and the length of which is approximately equal to the width of this expander element. Merging with this cylindrical zone 21 is the end with the smaller diameter of a cone 22, which merges with a cylindrical end 23 the diameter of which corresponds to that of the shank 19.

The expander element 14 or 14' of the externally threaded dowel 11 or 11' comprises two identical parts 26 and 26', substantially the shape of half shells, which are embodied and secured on the externally threaded bolt 12 in such a manner that on the one hand they are immovable relative to one another in the axial direction and on the other hand they hold in a positive manner against one another and against the bolt in the radial direction; in other words, they are secured against coming open.

Figure 2:
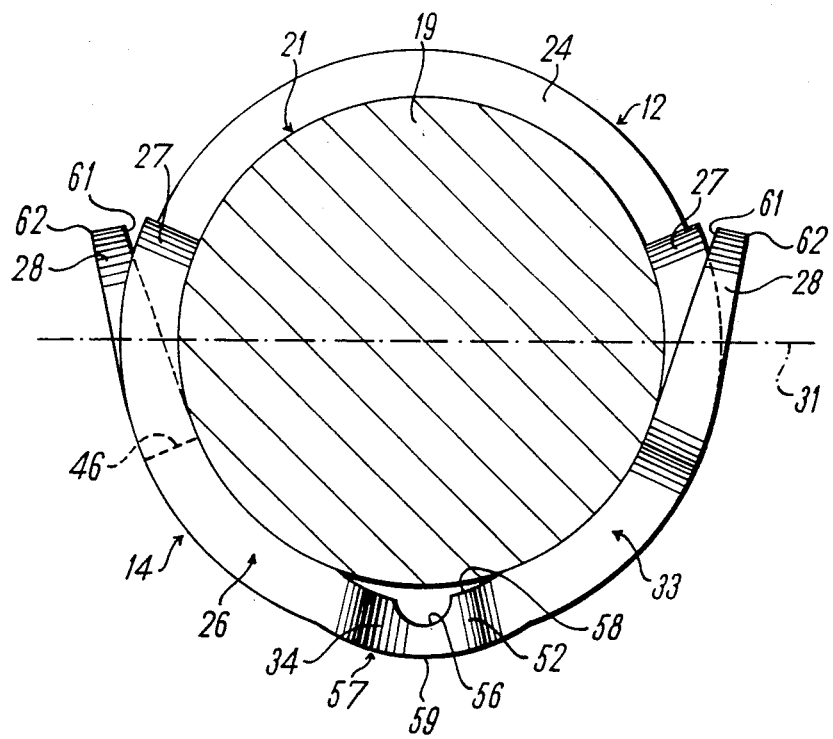
FIG. 2, on an enlarged scale, is a section taken along the line II—II of FIG. 1, but showing only one of the expander element parts surrounding the bolt, in accordance with a first exemplary embodiment of the invention.
Figure 6:
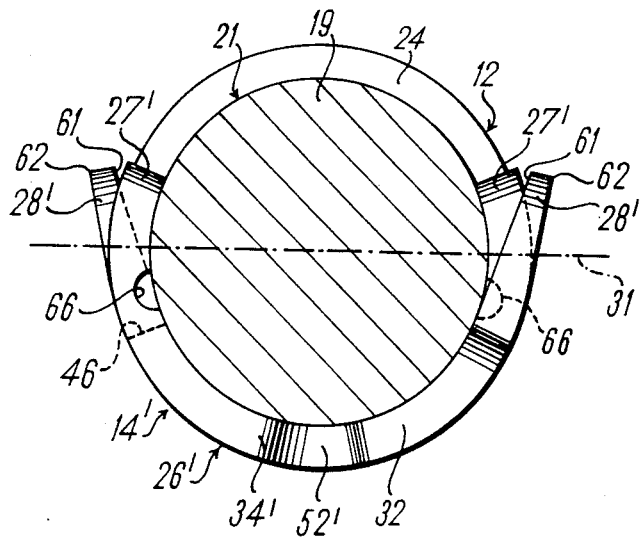
FIG. 6 is again a section taken along the line II—II of FIG. 1, but with only one of the expander element parts surrounding the bolt and in accordance with a second exemplary embodiment.

As shown particularly in FIGS. 3-5 and 7-9, each expander element part 26 or 26' is stamped from a flat sheet or plate in such a manner that its basic shape is approximately rectangular, with a front and back surface. On the long or longitudinal sides of the rectangle two lobes 27 and 28 or 27' and 28' per side are formed. The outer lobes 27 and 27' toward the end face and the inner lobes 28 and 28' toward the middle are shaped or stamped out at the two long sides in such a manner that the part 26 or 26' is point-symmetrical in the developed view; this means that each expander element part 26, 26' has only one position with respect to its lobes and is thus always positioned correctly, or in other words is transversely symmetrical. From the flat state, the expander element part 26, 26' is bent into a cylindrical half shell, as shown in FIG. 2 and FIG. 6. The central body part 29 or 29' of the expander element part 26, 26', which does not form a complete half shell, is provided with an inside radius which corresponds to the outside radius of the cylindrical zone 21 of the bolt 12. The shaped lobes 27 and 28 or 27' and 28' extend beyond the plane of separation 31 of the expander element 14 of 14' shown in FIG. 2 and in FIG. 6 in such a manner that the plane of separation 31 divides them approximately in half in length.

According to FIGS. 3-5, in the first exemplary embodiment of the present invention each expander element part 26 is provided in the vicinity of its back 34, preferably its central transverse plane 51, from the direction of the two end faces 32 and 33 with respective groove-like notches 52, 53, between the bottom areas 54 of which a groove 56 extends, being disposed along the central transverse plane 51. The groove 56 is embodied like a furrow and has a depth corresponding to half the thickness of the material. The groove 56 is narrower than would correspond to the width of the stamped-out notches 52, 53. The groove 56 may either be pressed in in the middle of the sheet, or else it can be provided at intervals in a strip of sheet metal of appropriate profile, the width of which corresponds to the length of the expander element part 26. In forming the expander element part 26 into a half shell, a deformation 57 is made in the vicinity of the groove 56, as shown in FIG. 2, this deformation 57 being wider than the groove 56, so that on the inside of the half shell 26 a crimp region 58 is formed, while a bulge 59 results on the outside. The crimp 58 is wider than the groove 56, preferably by a factor of 2 to 3, and the bulge region 59 is somewhat wider than the notches 52, 53. This deformation 57 extends substantially over the entire length of the expander element part 26, that is from one end face 32 to the other end face 33. The expander element part 26 is furthermore provided on the inner lobes 28 with a bevelled or flattened ara 61, which is produced by cold working, for instance of the inner surface of the expander element part 26. It will be understood that instead of this, or in addition, the outside of the lobe 28 may be provided with a bevelled area of this kind. The bevelled area 61 is disposed on the free end of the lobe 28 which protrudes beyond the plane of separation 31. As seen in FIG. 2, the expander element part 26 is shaped into a half shell in such a manner that the outer lobes 27 also have the same inside radius beyond the plane of separation 31, while the inner lobes 28 protrude radially outward, beginning from a region below this plane of separation 31. Regardless of whether the bevelled area 61 is provided on the inner (front) or the outer (back) surface or both, the inside distance or clearance between the outer edges 62 of the free ends of the lobes 28 is always the same size.

Figures 7, 8, 9:
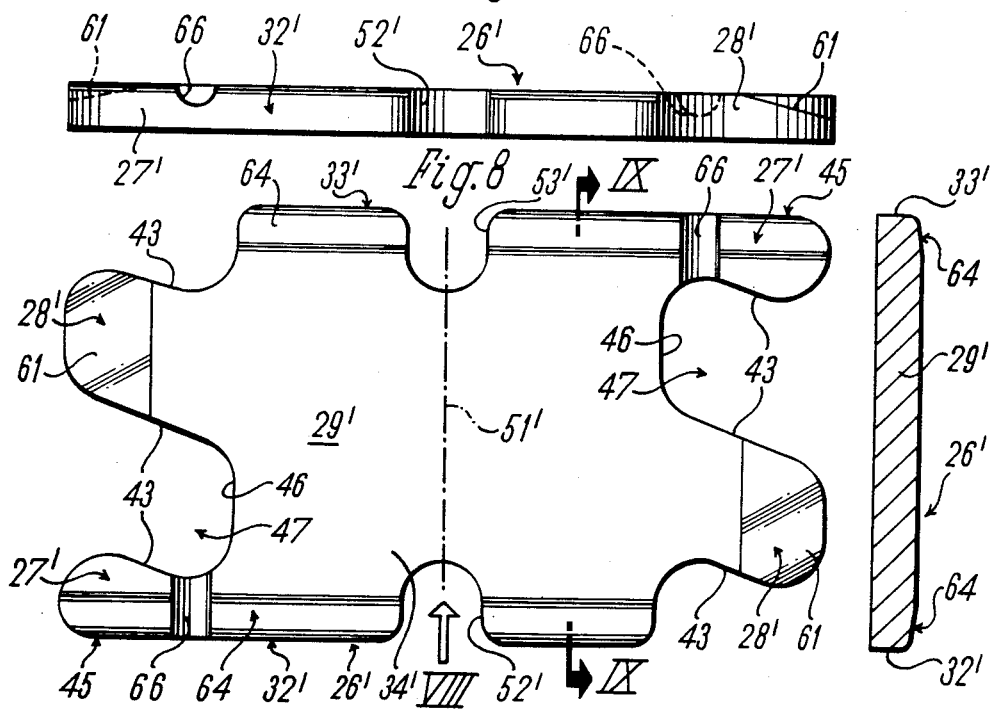
FIG. 7 is a developed view of the expander element part of FIG. 6.
FIG. 8 is a view taken in the direction of the arrow VIII of FIG. 7.
FIG. 9 is a section taken along the line IX—IX of FIG. 7.

As shown in FIGS. 7-9, in the second exemplary embodiment of the present invention, again each expander element part 26' is provided with a respective groove-like stamped-out notch 52', 53' in the vicinity of its back 34', preferably from the direction of the two end faces 32' and 33'. The expander element part 26' is again also provided on the inner lobes 28' with the bevelled area 61 in the same manner, this bevelled area 61 being produced by cold working, for instance of the inner surface of the expander element part 26'.

As shown in FIG. 6, the expander element part 26' is again shaped into a half shell in such a manner that the outer lobes 27' again have the same inner radius beyond the plane of separation 31 as well, while the inner lobes 28' protrude radially outward, beginning at an area below this plane of separation 31. Regardless of whether the bevelled area 61 is provided on the inner or the outer surface or both, the inside distance or clearance between the outer edges 62 of the free ends of the lobes 28' is always the same size. Like the part 26, the expander element part 26' can also be provided at its back 34' with a flattening or widening (corresponding to the flattening or widening 57), which is shaped into an inner crimp region and an outer bulge region.

As FIG. 6 also shows, in the second exemplary embodiment the outer lobes 27' are provided, beginning at their inside, with a weakening groove 66, the depth of which is approximately half the thickness of the material, so that the outer lobes 27' can spread apart more easily upon the relative movement between the expander element 14' and the bolt cone 22. The weakening grooves 66 are located in a region that is preferably approximately in the middle between the plane of separation 31 and the bottom 46 of the associated recess 47 formed by adjacent lobes 27' and 28' and is thus located at approximately the narrowest point of the outer lobes 27'. As a result, the outer lobes 27', which in themselves encompass the bolt 12 over an angle of more than 180°, can be bent up at locations where the angular spacing amounts to less than 180°.

In both exemplary embodiments, as shown in FIGS. 3 and 5 as well as 7 and 9, the end edges of the two end faces 32, 33 and 32', 33' of parts 26 or 26', which in the state where the part is bent into the shape of a half shell are located on the inside, are provided over the entire width or length with a slippage bevel 64, which is oriented toward the outer circumference of the threaded bolt zones 21–23; this prevents the parts 26 or 26' from seizing on the bolt 12 during their relative movement with respect to one another.

In both exemplary embodiments shown, the expander element parts 26 or 26' are embodied in such a manner that in the state in which they are mounted on the bolt 12 they hold both against one another and on the cylindrical bolt zone 23. The latter result is attained in that the outer lobes 27 or 27', upon placement onto the bolt zone 21, are elastically spread apart in the radial direction. The first effect is attained by the particular embodiment of the inner jacket lines or rims of the lobes 27 and 28 or 27' and 28'. While the outer bottom rims 45 of the outer lobes 27, 27' each represent an extension of the straight end faces 32, 33 or 32', 33' of the parts 26 or 26', the inner lateral rims 43 of the recesses 47, which unlike the bottom rims 45 do not extend parallel to the longitudinal axis of the parts 26, are disposed at an acute angle relative to the end face 32, 33 or 32', 33 or to the transverse central plane 51. The individual inner rims 43 of the interlocking or adjacently engaged lobes 27 and 28 or 27' and 28' are parallel. While the inner lobes 28 or 28' are approximately in the shape of a parallelogram, the outer lobes 27 or 27' are thickened in a lobe-like manner, that is, on their front end. The two half-shell elements 26 or 26' are merely mounted on the cylindrical zone 21 of the bolt 12 in such a manner that two half shells mounted on opposing sides of this bolt zone 21 are pressed against one another in the radial direction so that they snap into one another. The end faces 32 or 32' of the two expander element parts 26 or 26' of the expander element 14 or 14' then rest, as shown in FIG. 1, on the collar or shoulder 24 of the bolt zone 19. In this manner it is attained that the two expander element parts 26 or 26' are practically incapable of being readily displaced in the axial direction, and thus the two parts cannot come apart radially either, because of the oblique rims 43.

For assembly, the externally threaded dowel, peg or bolt 11, 11' is hammered into the bore 41, whereupon the expander element 14, 14' is pressed in so that it rests against the shoulder 24 and locks in place inside the bore 41, particularly because of the claw-like abutment of the outer edges 62 of the inner lobes 28, 28'. The externally threaded dowel 11, 11' is hammered in far enough that the nut 13 disposed at the beginning of the threaded part 16 comes to rest against the object that is to be secured. The nut 13 is then turned such that the threaded bolt 12 is pulled out of the bore 41. Because of the initial locking of the expander element 14, 14' inside the bore 41, the expander element remains in place, so that the cone 22 of the bolt 12 slides into the expander element 14, 14', that is, between the two parts 26 or 26' thereof, causing these parts to be spread apart in the radial direction and resulting in a further increase in the locking effect.

If a crack or fissure now occurs in the concrete ceiling, wall or the like in the vicinity of the bore 41, so that the bore becomes larger by the amount of the width of the crack, then the locking effect is reduced, and the bolt 12 is pulled out of the bore 41 by the weight of the object being secured.

The force exerted by the material counter to the spreading apart of the expander element parts 26, 26' is attenuated by the stamped-out notches 52, grooves 56 and deformations 57, or by the stamped-out notches 52 and the grooves 66, in such a manner that the remnant friction, which still exists even in the case of the cracked bore, between the expander element parts 26, 26' and the inner wall of the bore 41 keeps the expander element parts in place in the bore 41, even though the bolt 12 and thus its conical region 22 has the tendency to slide out of the bore 41. As a result of this axial movement of the bolt cone 22, the expander element parts 26, 26' are opened out or spread apart once again. The frictional resistance between the expander element parts 26, 26' and the bolt cone 22 is also reduced to a minimum by the fact that the inner lobes 28, 28' are provided with the flattening 61, so that some free space remains available for spreading open. In every case, a repeated spreading open and hence re-locking of the expander element parts 26, 26' in place inside the cracked bore 41 is attained up to a certain extent.

What is claimed is:

1. A device for fastening an object to a wall, or the like, as a plug-in mounting, comprising:
    a bolt having an externally threaded portion at one end and an expander element mounting portion at the other end, the expander element mounting portion including a partially conical section, the maximum diameter of which is equal to the maximum diameter of the bolt;
    a nut for threadedly engaging the threaded portions; and
    an expander element including a pair of substantially half-shell parts held in a displaceable manner on the expander element mounting portion, each having a body part with front and back surfaces, opposed longitudinal edges and opposed transverse edges, each opposed longitudinal edge having at least two lobes formed thereon, such that each half-shell part is transversely symmetrical, and, when viewed in development, is point symmetrical, each said half-shell part further having:
    (i) a notch formed in at least one transverse edge;
    (ii) a weakening groove defined in one of the lobes formed on each longitudinal edge, said weakening groove extending over substantially the entire width of its respective lobe; and
    (iii) a bevelled area defined in the other of the lobes formed on each longitudinal edge, said bevelled area being defined in at least one of said front and back surfaces.

2. The device as defined in claim 1, wherein the bevelled area is defined in the front and back surface.

3. The device as defined in claim 1, wherein a notch is formed in each transverse edge.

4. The device as defined in claim 1, wherein the bevelled areas are located approximately in the front half, oriented toward the free end, of its respective lobes.

5. The device as defined in claim 1, wherein adjacent lobes at each longitudinal edge define a recess between them, which recess includes a bottom surface between the lobes, and wherein the weakening groove is disposed between the bottom surface and a plane of separation defined by the expander element.

6. The device as defined in claim 5, wherein the weakening groove is located at the narrowest part of its respective lobe.

7. The device as defined in claim 1, wherein each said half-shell part further has:
    (iv) a flattened area including a crimp region defined on one surface and a bulge region defined on the other surface.

8. A device for fastening an object to a wall, or the like, as a plug-in mounting, comprising:
    a bolt having an externally threaded portion at one end and an expander element mounting portion at the other end, the expander element mounting portion including a partially conical section, the maximum diameter of which is equal to the maximum diameter of the bolt;
    a nut for threadedly engaging the threaded portion;
    an expander element including a pair of substantially half-shell parts held in a displaceable manner on the expander element mounting portion, each having a body part with front and back surfaces, opposed longitudinal edges and opposed transverse edges, each opposed longitudinal edge having at least two lobes formed thereon, such that each half-shell part is tranversely symmetrical, and, when viewed in development, is point symmetrical, with one of the lobes formed on each longitudinal edge being provided with a weakening groove extending substantially over its width, each said half-shell part further having:
    (i) a notch formed in at least one transverse edge;
    (ii) a substantially longitudinally extending groove formed in one of said surfaces;
    (iii) a crimp region formed in said surface adjacent to at least one side of the longitudinal groove; and
    (iv) a bulge region formed in the other of said surfaces substantially adjacent to the longitudinal groove.

9. The device as defined in claim 8, wherein the substantially longitudinally extending groove is formed in a flattened area of the body part and in the back surface thereof, in which area the crimp region and bulge region are formed.

10. The device as defined in claim 8, wherein the substantially longitudinally extending groove is substantially smaller than the crimp region.

11. The device as defined in claim 8, wherein a notch is formed in each transverse edge.

12. The device as defined in claim 11, wherein each notch is narrower than the bulge region.

13. The device as defined in claim 8, wherein the front surface includes at least one slippage bevel region which intersects a transverse edge.

14. A device for fastening an object to a wall, or the like, as a plug-in mounting, comprising:
    a bolt having an externally threaded portion at one end and an expander element mounting portion at the other end, the expander element mounting portion including a partially conical section, the maximum diameter of which is equal to the maximum diameter of the bolt;

a nut for threadedly engaging the threaded portion; and an expander element including a pair of substantially half-shell parts held in a displaceable manner on the expander element mounting portion, each having a body part with front and back surfaces, opposed longitudinal edges and opposed transverse edges, each opposed longitudinal edge having at least two lobes formed thereon, such that each half-shell part is transversely symmetrical and, when viewed in development, is point symmetrical, with one of the lobes formed on each longitudinal edge extending outwardly from the body part at a tangent and being provided with a bevelled area on the front surface, and with the other of the lobes formed on each longitudinal edge being provided with a weakening groove extending substantially over its width, each said half-shell part further having:

(i) a notch formed in at least one transverse edge;
(ii) a substantially longitudinally extending groove formed in one of said surfaces;
(iii) a crimp region formed in said surface adjacent to at least one side of the longitudinal groove; and
(iv) a bulge region formed in the other of said surface substantially adjacent to the longitudinal groove.

15. The device as defined in claim 14, wherein the bevelled area is located approximately in the front half, oriented toward the free end, of its respective lobe.

16. The device as defined in claim 14, wherein the substantially longitudinally extending groove is formed in a flattened area of the body part and in the back surface thereof, in which area the crimp region and bulge region are formed.

17. The device as defined in claim 14, wherein the substantially longitudinally extending groove is substantially smaller than the crimp region.

18. The device as defined in claim 14, wherein a notch is formed in each transverse edge.

19. The device as defined in claim 18, wherein each notch is narrower that the bulge region.

20. The device as defined in claim 14, wherein the front surface includes at least one slippage bevel region which intersects a transverse edge.

21. A device for fastening an object to a wall, or the like, as a plug-in mounting, comprising:

a bolt having an externally threaded portion at one end and an expander element mounting portion at the other end, the expander element mounting portion including a partially conical section, the maximum diameter of which is equal to the maximum diameter of the bolt;

a nut for threadedly engaging the threaded portion; and an expander element including a pair of substantially half-shell parts held in a displaceable manner on the expander element mounting portion, each having a body part with front and back surfaces, opposed longitudinal edges and opposed transverse edges, each opposed longitudinal edge having at least two lobes formed thereon, such that each half-shell part is transversely symmetrical, and, when viewed in development, is point symmetrical, with one of the lobes formed on each longitudinal edge extending outwardly from the body part at a tangent and being provided with a bevelled area on the back surface, and with the other of the lobes formed on each longitudinal edge being provided with a weakening groove extending substantially over its width, each said half-shell part further having:

(i) a notch formed in at least one transverse edge;
(ii) a substantially longitudinally extending groove formed in one of said surfaces;
(iii) a crimp region formed in said surface adjacent to at least one side of the longitudinal groove; and
(iv) a bulge region formed in the other of said surfaces substantially adjacent to the longitudinal groove.

22. The device as defined in claim 21, wherein the bevelled area is located approximately in the front half, oriented toward the free end, of its respective lobe.

23. The device as defined in claim 21, wherein the substantially longitudinally extending groove is formed in a flattened area of the body part and in the back surface, thereof, in which area the crimp region and bulge region are formed.

24. The device as defined in claim 21, wherein the substantially longitudinally extending groove is substantially smaller than the crimp region.

25. The device as defined in claim 21, wherein a notch is formed in each transverse edge.

26. The device as defined in claim 25, wherein each notch is narrower that the bulge region.

27. The device as defined in claim 21, wherein the front surface includes at least one slippage bevel region which intersects a transverse edge.

28. A device for fastening an object to a wall, or the like, as a plug-in mounting compromising:

a bolt having an externally threaded portion at one end and an expander element mounting protion at the other end, the expander element mounting portion including a partially conical section, the maximum diameter of which is equal to the maximum diameter of the bolt;

a nut for threadedly engaging the threaded portion; and an expander element including a pair of substantially half-shell parts held in a displaceable manner on the expander element mounting portion, each having a body part with front and back surfaces, opposed longitudinal edges and opposed transverse edges, each opposed longitudinal edge having at least two lobes formed thereon, such that each half-shell part is transversely symmetrical, and, when viewed in development, is point symmetrical, with one of the lobes formed on each longitudinal edge extending outwardly from the body part at a tangent and being provided with a bevelled area on the front and back surface, and with the other of the lobes formed on each longitudinal edge being provided with a weakening groove extending substantially over its width, each said half-shell part further having:

(i) a notch formed in at least one transverse edge;
(ii) a substantially longitudinally extending groove formed in one of said surfaces;
(iii) a crimp region formed in said surface adjacent to at least one side of the longitudinal groove; and
(iv) a bulge region formed in the other of said surfaces substantially adjacent to the longitudinal groove.

29. The device as defined in claim 28, wherein the bevelled areas are located approximately in the front half, oriented toward the free end, of its respective lobes.

30. The device as defined in claim 28, wherein the substantially longitudinally extending groove is formed in a flattened area of the body part and in the back surface thereof, in which area the crimp region and bulge region are formed.

31. The device as defined in claim 28, wherein the substantially longitudinally extending groove is substantially smaller than the crimp region.

32. The device as defined in claim 28, wherein a notch is formed in each transverse edge.

33. The device as defined in claim 32, wherein each notch is formed is narrower than the bulge region.

34. The device as defined in claim 28, wherein the front surface includes at least one slippage bevel region which intersects a transverse edge.

* * * * *